F. L. MORSE.
SAFETY GEAR WHEEL.
APPLICATION FILED JAN. 3, 1911.

1,160,311.

Patented Nov. 16, 1915.

WITNESSES

INVENTOR
Frank L. Morse
BY
Edward A. Wright
ATTORNEY

UNITED STATES PATENT OFFICE.

FRANK L. MORSE, OF ITHACA, NEW YORK, ASSIGNOR TO MORSE CHAIN COMPANY, OF ITHACA, NEW YORK, A CORPORATION OF NEW YORK.

SAFETY GEAR-WHEEL.

1,160,311.  Specification of Letters Patent.  Patented Nov. 16, 1915.

Application filed January 3, 1911. Serial No. 600,646.

*To all whom it may concern:*

Be it known that I, FRANK L. MORSE, a citizen of the United States, residing at Ithaca, in the county of Tompkins and State of New York, have invented new and useful Improvements in a Safety Gear-Wheel, of which the following is a specification.

This invention relates to gearing and more particularly to power transmission mechanism having a positive driving connection, such as directly engaging gear teeth or chain drives operating upon sprocket wheels, the object being to provide an improved safety connection between the gear teeth and shaft and adapted to yield upon excessive stresses to permit a relative movement between these parts and thereby prevent a breakage of some more important and expensive piece of the machinery when, for any reason there is a sudden stoppage of the driven member.

Figure 1:
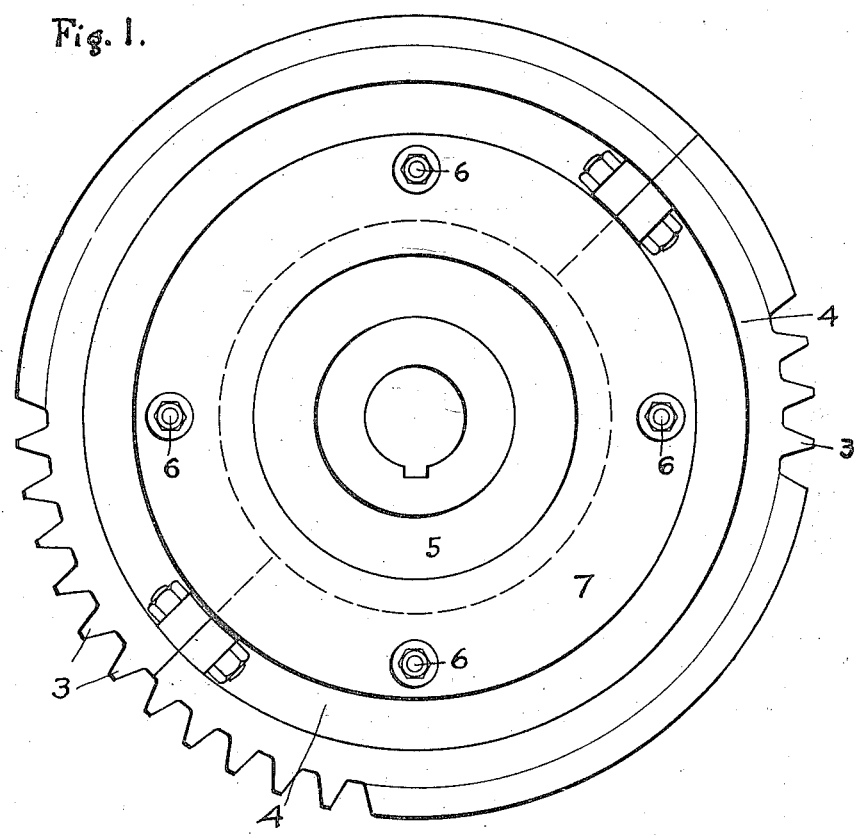
Figure 2:
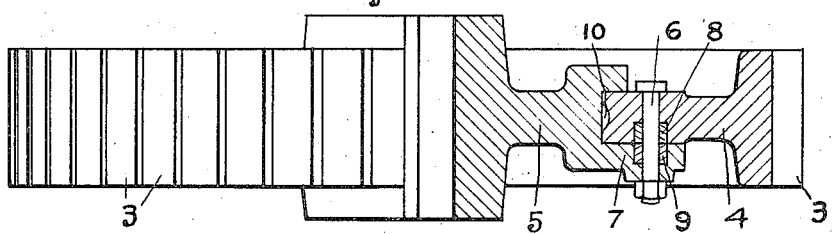

In the accompanying drawing, Figure 1 is a side elevation, and Fig. 2, a part plan and part horizontal section of a gear wheel embodying one form of my improvement.

According to this construction, the sprockets or gear teeth, 3, are carried upon a rim, 4, mounted with the capacity of relative movement upon the body or hub, 5, of the wheel which is adapted to be keyed upon a shaft. While the gear teeth are fully shown in Fig. 1, only at certain portions of the rim, it will be readily understood that they extend all the way around the circumference of the wheel.

For the safety connection which is adapted to yield or to be severed by excessive strains produced by the sudden stoppage of the driven wheel or shaft, I prefer to employ one or more pins or bolts, 6, by which the rim is fastened to the hub or body portion of the wheel, the bolts being of the desired size and metal to afford a certain amount of resistance to shear which may be readily varied to suit different conditions by varying the number or size of shearing bolts used. At the point where the shearing bolts or pins, 6, pass through the rim, 4, and the flange, 7, of the hub, I preferably insert die blocks, 8, and 9, of hardened steel, so that when the gear is subjected to excessive stress, the pins, 6, will be readily sheared off and the rim, 4, then revolve relative to the shaft or hub of the wheel, thus preventing the breakage of important parts of the driving gear.

The rim may be either split or otherwise formed to be mounted on the wheel and at the bearing surface between the rim and the wheel, a groove, 10, is preferably provided for holding a lubricant, such as cup grease, for assisting the free rotative movement of the rim when the safety pins or bolts have sheared off due to excessive stresses.

It will now be seen that I have provided a very simple and effective construction which operates as a rigid or integral gear or sprocket wheel as long as the same is not subjected to excessive strains which would be liable to break the gear teeth or other important parts of the driving mechanism, but that when such strains occur, the safety connection, that is the shearing pins are readily sheared off, thereby permitting the rim to continue to revolve upon its lubricated bearing surface on the hub or body of the wheel, without injury to any of the important parts. The pins may then be readily removed and renewed at little expense, thus placing the gear again in condition for operation with little or no loss of time or injury to the mechanism.

What I claim as new and desire to secure by Letters Patent, is:

A safety gear wheel comprising a body portion having two radially extending flanges with a bearing surface between the same, a rim having a web portion rotatably mounted on said bearing surface between said flanges and provided with a lubricant groove, shearing bolts passing through said web and one of said flanges, and hardened metal die blocks inserted in said web and flange at the shearing point of the bolt.

In testimony whereof I have hereunto set my hand.

FRANK L. MORSE.

Witnesses:
 ALFRED B. WRAY,
 T. M. MANLEY.